United States Patent [19]
O'Neill

[11] Patent Number: 5,559,866
[45] Date of Patent: Sep. 24, 1996

[54] METHOD OF REUSE THROUGH REMOTE ANTENNA AND SAME CHANNEL CELL DIVISION

[75] Inventor: Frank O'Neill, Richland Hills, Tex.

[73] Assignee: Motorola, Inc., Schaumburg, Ill.

[21] Appl. No.: 376,476

[22] Filed: Jan. 20, 1995

Related U.S. Application Data

[63] Continuation of Ser. No. 891,247, Jun. 1, 1992, abandoned.

[51] Int. Cl.⁶ .................................................. H04Q 7/22
[52] U.S. Cl. .................... 379/60; 379/59; 455/33.2; 455/33.3; 455/51.2
[58] Field of Search ....................... 379/58, 59, 60; 455/33.1, 33.2, 33.3, 33.4, 54.1, 54.2, 56.1, 51.2, 51.1, 38.5, 62

[56] References Cited

U.S. PATENT DOCUMENTS

| | | | |
|---|---|---|---|
| 4,144,411 | 3/1979 | Frenkiel | 379/60 |
| 4,144,496 | 3/1979 | Cunningham et al. | 455/33.3 |
| 4,704,734 | 11/1987 | Menich et al. | 455/33.3 |
| 4,759,051 | 7/1988 | Han | 379/59 |
| 5,067,147 | 11/1991 | Lee | 379/60 |
| 5,239,671 | 8/1993 | Linquist et al. | 455/56.1 X |
| 5,263,177 | 11/1993 | Schieve et al. | 455/51.2 |

*Primary Examiner*—Curtis Kuntz
*Assistant Examiner*—G. J. Oehling
*Attorney, Agent, or Firm*—Raymond J. Warren; Kevin A. Buford

[57] ABSTRACT

A method of providing communication services in a cellular communication system which consists of a plurality of service coverage areas having a plurality of shared frequency microcells. Each microcell has an omnidirectional, remote antenna interconnected with a base site. The method consists of receiving a request, at the base site, to provide communication access to a communication unit. A supervisory audio tone is simulcast through each omnidirectional, remote antenna of the plurality of shared frequency microcells. A signal quality factor of a looped-back supervisory audio tone received from the communication unit at each omnidirectional, remote antenna is then measured. A communication link between the communication unit and base site is then established through a selected antenna of said plurality of omnidirectional, remote antennas. The antenna is selected based upon the signal quality factor of the looped-back supervisory audio tone.

8 Claims, 3 Drawing Sheets

METHOD OF REUSE THROUGH REMOTE ANTENNA AND SAME CHANNEL CELL DIVISION

This is a continuation of application Ser. No. 07/891,247, filed Jun. 1, 1992 and now abandoned.

FIELD OF THE INVENTION

This invention relates to communication systems and in specific to radio frequency communication systems.

BACKGROUND OF THE INVENTION

Cellular radiotelephone systems are known. Such systems are typically divided over geographical areas into substantially contiguous service coverage areas, each served from a base site. Mobile communication units passing through a service coverage area of a base site typically transmit service requests to the base site, which request is answered by the base site with a resource allocation for use by the requesting communication unit. Such a system is typically referred to as a frequency division multiple access system (FDMA).

Communication resources used by a base site, and allocated to the communication system, may consist of a frequency spectrum divided for use by the system into a number of communication resources. Each communication resource may consist of a pair of frequencies. The pair of frequencies may be used by a communication unit to transmit and receive information.

Communication resources use by a base site may also be divided by function with at least one resource, in some systems, reserved for the two-way transmission of control information between the base site and communication unit. Other resources may be reserved for use for communication transactions by communication units.

Since a limited number of communication resources may exist within a frequency spectrum the reuse of communication resources is necessary within the geographic area served by the communication system. Reuse, on the other hand, is often limited by mutual interference between communication units and base sites, operating on the same frequency in the same system.

Reuse of a communication resource within a communication system is limited by a number of factors. Chief among the factors, specifically in a communication system having an omnidirectional antenna structure, is distance between reusing transmitters and the power of the transmitted signal. The distance between reusing communication units is often specified in terms of the ratio of the distance (D) between the centers of nearest, neighboring co-channel cells to the radius (r) of a cell. The reuse ratio, D/r, (reuse ratio) specifies the proximity of the closest reusing base site.

As the power of the transmitted signal is reduced the proximity between reusing base sites may also be reduced. One patent teaching of such an approach is that of Cunningham et al. (U.S. Pat. No. 4,144,496). Cunningham teaches of a method of subdividing a large cell into a number of smaller cells. Communication resources assigned to the large cell are divided among the smaller cells. Directional antennas are also used in Cunningham to isolate reusing base sites in an effort to reduce co-channel interference.

The use of directional antennas was also taught in Graziano (U.S. Pat. No. 4,128,740) as a method of reducing the reuse factor. Directional antennas were used in Graziano in combination with a resource assignment algorithm to produce a co-channel reuse ratio of 4.

Advances (described in Cunningham) resulting in a reduced reuse factor, in the prior art, have been drawn to the development of directional antennas and selective assignment of frequencies. Past developments (as in Graziano) have included cells divided into as many as six sectors with a 60 degree sector antenna providing coverage within each sector. The selective assignment of resources then precluded reassignment of adjacent channel resources within adjacent sectors. Use of the 60 degree sector antennas, and the selective assignment of frequencies, as mentioned, have resulted in reuse factors as low as four.

Other approaches, such as described in Lee (U.S. Pat. No. 4,932,049), have been to locate a number of directional antenna sets around the periphery of a service coverage area, directed into the cell, and to provide service to mobile communication units from the nearest antenna. Included within the Lee system is a master antenna set and a number of slave antenna sets. Control information, within the Lee system, is exchanged with mobiles from a directional antenna located at the master site to mobiles throughout the service area.

While past efforts have been effective in reducing reuse distances, difficulties are often experienced. Under Lee, Cunningham, Graziano, or other prior art techniques, positioning of base sites and directionality of antennas becomes critical for effective cell coverage. Where cells have been divided, the division of frequencies among the divided cells further complicates the ability of a system to accommodate dynamic loading fluctuations within the system. Natural and man-made obstructions, such as hills or tall buildings, often interfere with transmissions within such systems.

While the transmission difficulties offered by hills or tall buildings may be overcome by multiple antenna systems, as in Lee, the difficulties offered by directional antennas remain. Further, because the Lee control antenna must transceive from the periphery of the cell, across the full diameter of the cell, the reduced-power advantage of the Lee multiple antenna cell is partially negated by the power that must be used in transmitting control signals.

As the number of subscribers to cellular systems increases the size of cells must be reduced to accommodate the heavier loads. Such loads are accommodated through the reduced reuse distances associated with smaller cells.

As the service coverage areas of cells decrease, the problems associated with dynamic loading, and with obstructions, increase. Where service coverage areas decrease to areas of less than a mile, signal obstructions offered by buildings or tunnels become significant. Because of the need for reliable communication a need exists for a method of expanding cell capacity that is less dependent on positioning and directionality of antenna.

SUMMARY OF THE INVENTION

In a cellular communication system having a number of service coverage areas, a method is offered of providing communication services within at least one service coverage area of the number of service areas. The method comprising the step of providing a plurality of omnidirectional, remote antennas within the at least one service coverage area of the number of areas. The method further includes the steps of identifying an antenna of the number of remote antennas proximate a requesting communication unit and providing communication services to the requesting communication unit through the identified remote antenna.

BRIEF DESCRIPTION OF THE DRAWING

FIG. 4 depicts microcellular service areas providing communication access to a communication unit in accordance with the invention.

DETAILED DESCRIPTION OF THE PREFERRED EMBODIMENT

The solution to the problem of increasing cell capacity in a cellular system without the associated problems of directionality and frequency divisions lies, conceptually, in the placement of low-power, omnidirectional, remote antennas throughout a cell; operating on a common frequency set; and providing communication services to mobiles through the nearest remote antenna. Such a system offers the advantage of reduced power levels through central antenna positioning and through same-frequency handoffs among antennas, proximate a moving mobile.

Where control traffic is simultaneously transceived through the remote antennas, under a simulcast format, at power levels similar to other subscriber traffic, cochannel interference may be minimized across an entire reused frequency spectrum. Such a system, because of the lower power levels of both control and subscriber traffic, offers the opportunity of minimizing distances between other, reusing cells operating on a same set of frequencies.

Figure 1:
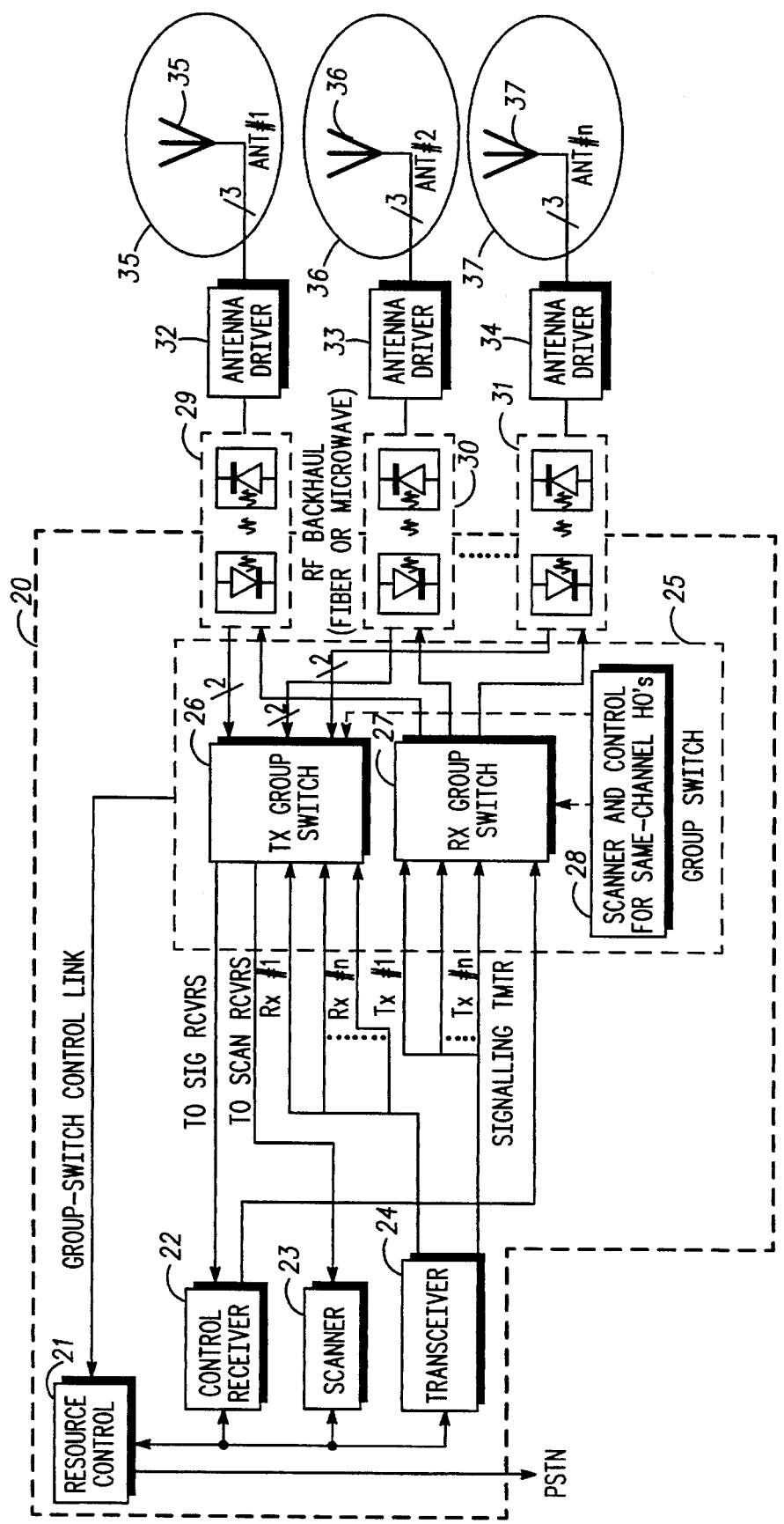
FIG. 1 is a block diagram of a microcellular base site in accordance with the invention.

Shown in FIG. 1 is a block diagram of a base site, generally (20), of m remote antennas (providing coverage of m microcells) and n voice channels. Such a base site (20) is used to provide communication services within a service coverage area in accordance with the invention.

A voice channel within such a system (20) may be a frequency pair of a frequency division multiple access system or, a time slot under a time division multiple access system. A voice channel may also represent a code key under a code division multiple access system.

Included within the base site (20) is a resource controller (21) control transceiver (22), scanner (23), transceiver for subscriber traffic (24), and a group switch (25). While depicted as a single unit, transceiver (24) is comprised of n transceivers providing n voice channels. (A voice channel may be comprised of a frequency pair, TDM slot, etc.) The control transceiver (22) is, under the preferred embodiment, comprised of at least one transmitter and m receivers.

The group switch (25) provides a means for routing signals to and from remote antenna (1-m) in microcells (35-37) between a mobile (not shown) in a microcell (35-37) and a transceiver (24) operating on an assigned voice channel (1-n). Control of signal routing for voice channels (1-n), within the group switch (25), is provided by the resource controller (21).

Signal connection between the group switch (25) and microcell antenna (1-m) in microcell (35-37) is provided through a radio frequency (RF) backhaul link (29-31) and antenna driver (32-34). The RF backhaul link (29-31) may be a fiber optic waveguide or microwave link.

Microcell antenna (1-m) (35-37), while shown in terms of a single antenna, include three antennas (not shown) at each remote site under the preferred embodiment. Included within the three antennas is a single transmitting antenna and two receiving antennas. The two receiving antenna provide diversity in reception of a received signal.

Because remote antennas (1-m) (35-37) are comprised of three antennas, the depicted RF backhaul (29-31) and antenna driver (32-34), in accordance with the preferred embodiment, are comprised of a number of signal paths (two receive and one transmit). The two receive inputs, in addition to requiring two RF backhaul (29-31) and antenna drivers (32-34), also require the RX group switch (26) to switch two received signal connections for each receive voice channel.

Figure 2:
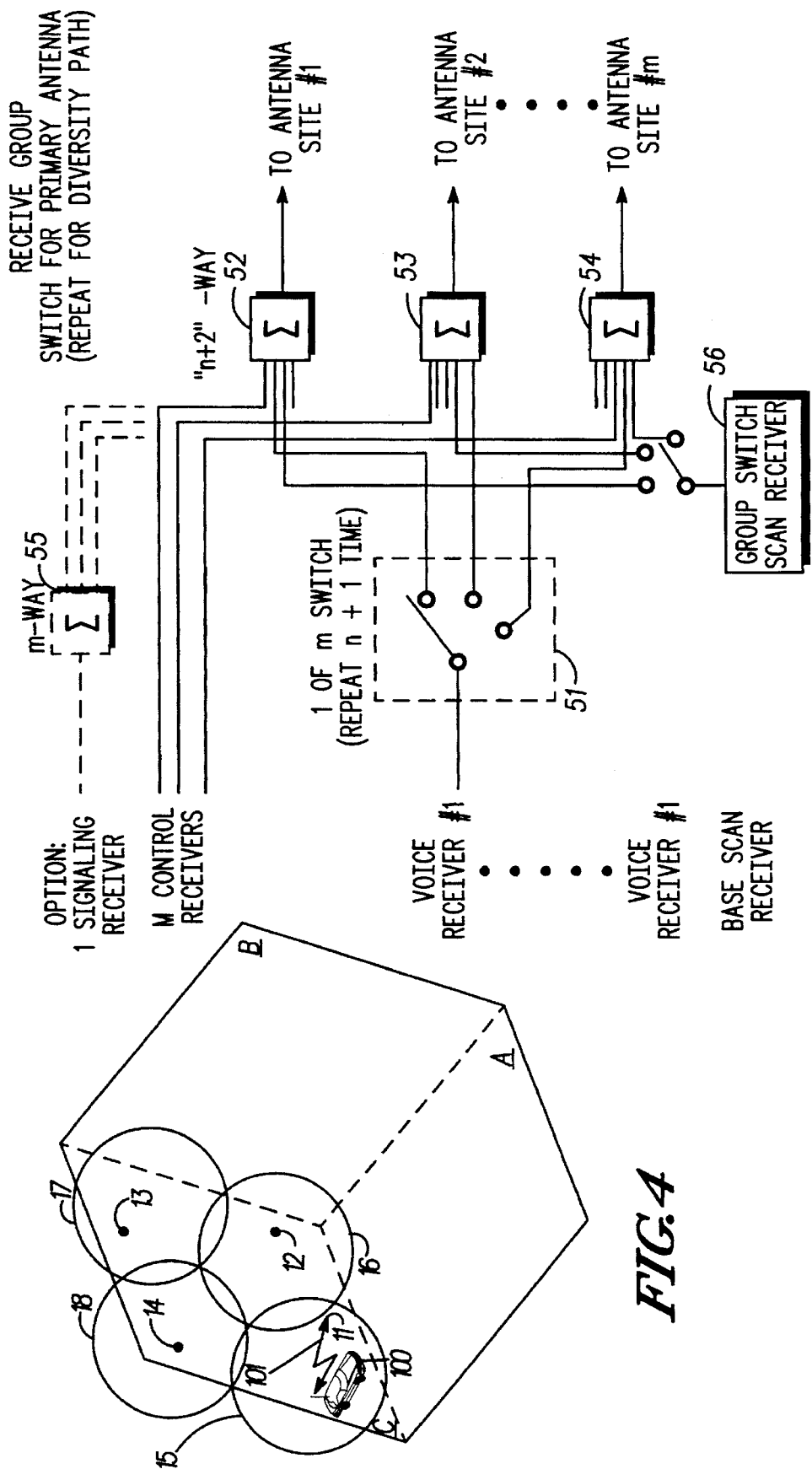
FIG. 2 depicts operation of a group switch of a receive voice channel within the microcellular base site in accordance with the invention.

Shown in FIG. 2 is a schematic of a single receive switching element (one of two required for diversity) of the RX group switch (26). As shown an m-position switch (51), under the control of the resource controller (21) routes a received signal from a selected antenna (1-m) from a remote antenna site (35-37) to a voice channel (1-n) within the transceiver (24). A duplicate of FIG. 2 supplies a second, diversity signal to a second input of the voice receiver (1-n) within the transceiver (24).

Figure 3:
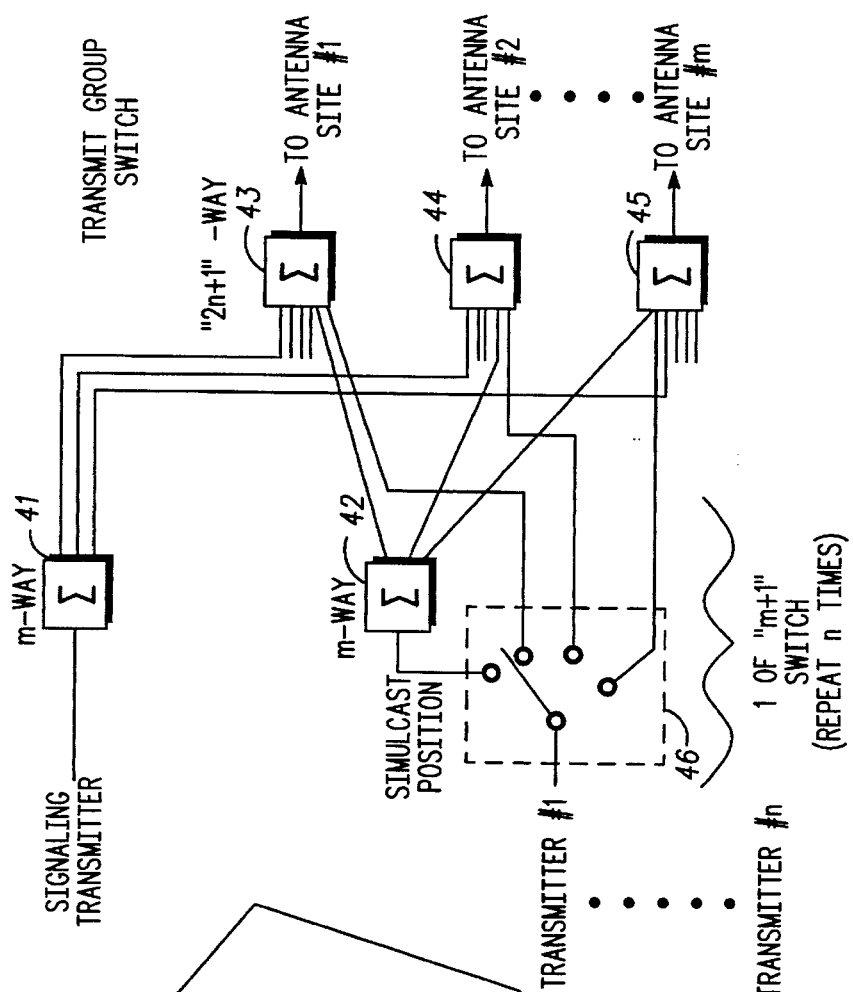
FIG. 3 depicts operation of a group switch of a transmit voice channel within the microcellular base site in accordance with the invention.

Likewise, a single transmit switching element (46) of the TX group switch (27) is shown in FIG. 3 for directing a transmitted signal to a selected remote antenna (1-m). Included within FIG. 3 is a splitting device (42) through which a transmitted signal may be simulcast from all antenna (1-m). Also shown within FIG. 3 is a splitting device (41) for the simultaneous transmission of control information through all remote antenna (1-m).

While transmitted control information is simulcast on all remote antenna (1-m), the opposite is true, under the preferred embodiment, of received control information. Shown in FIG. 2 are m connections to m control receivers within the control transceiver (22) from each of the m remote antenna (1-m). The use of a separate control receiver for each of the m remote antenna allows the base site (20) to locate a transmitting communication unit based upon the ID of the antenna receiving the control signal.

Shown in FIG. 4, by way of example, is a cell (10) divided into three, 120 degree service coverage areas A, B, and C. Included within service coverage area C are a number of remote antennas (11, 12, 13, and 14) providing service within associated microcells (15, 16, 17, and 18), in accordance with the invention. The remote antennas (11, 12, 13, and 14) are omnidirectional and are located to provide service substantially inclusive of the service area (C). Communication services within coverage area C is provided by a base site system substantially as shown in FIG. 1 (antenna #1 corresponds to remote antenna 11, antenna #2 corresponds to remote antenna 12, antenna 5 #m-1 (not shown) corresponds to remote antenna 13, and antenna #m corresponds to remote antenna 14).

A mobile communication unit (100), upon entering the service area (15) of remote antenna (11), may transmit an inbound signalling word (ISW) (101) to the antenna (11) requesting communication access. The ISW (101) contains a subscriber identification (ID) number of the communication unit (100) and an ID number of a communication target. The ISW (101), upon receipt by the remote antenna (11), is routed to the resource controller (21) through the antenna driver (32), RF backhaul (29), RX group switch (26), and control receiver for remote antenna 11 within the control transceiver (22). Within the RX group switch (26) the ISW successively passes through summing device 52 before arriving at the control receiver for remote antenna 11 within the control transceiver (22).

The resource controller (21) upon verification of authenticity of the subscriber ID, responds with a resource allocation to the requesting communication unit (100) identifying a communication resource (a frequency pair, time slot, etc.) to be used by the communication unit (100) in exchanging a communicated signal through the base site (20). The resource allocation is transferred to remote sites (11, 12, 13, and 14), for transmission to the communication unit (100), by, first, passing through the control transceiver (22), TX group switch (27), RF backhaul (29-31), and antenna drivers (32-34). Upon passing through the splitter (41) within the TX group switch (27) the resource allocation is simulcast on all remote antenna (11, 12, 13, and 14). The resource allocation is routed to remote antenna (11-14) through splitter (55) and summing devices (52-54).

In addition to causing the transmission of a resource allocation (101) to the requesting communication unit (100), the resource controller (21) also allocates a voice channel (e.g. #1) within the transceiver (24). The resource controller (21) also, through the Group Switch Control Link, causes the TX switch (46) and the RX switch (51) for voice channel #1 within the TX Group Switch (27) and the RX Group Switch (26), respectively, to connect to remote antenna 11.

Upon receipt of the resource allocation (101) by the communication unit (100), the unit (100) tunes to the assigned channel (#1) and begins exchanging a communicated signal through the base site (20). As a communicated signal is transmitted by the communication unit (100) on the inbound frequency of channel #1 the Group Switch Scan Receiver (56) of the Group Switch (25) measures a signal quality factor, such as signal strength, of the inbound frequency of channel #1 through each of the remote antennas (11-14).

The signal quality factors measured by the Group Switch Scan Receiver (56) are compared within a processor (not shown) within the Scanner and Control for Same-channel Hand Offs (28). Where the measured signal quality factor of another antenna (12-14) exceeds the value measured through the serving antenna (11), by a threshold value, a same-channel handoff is initiated by the Scanner and Control for Same-channel HO's (28).

Figures 5, 6:
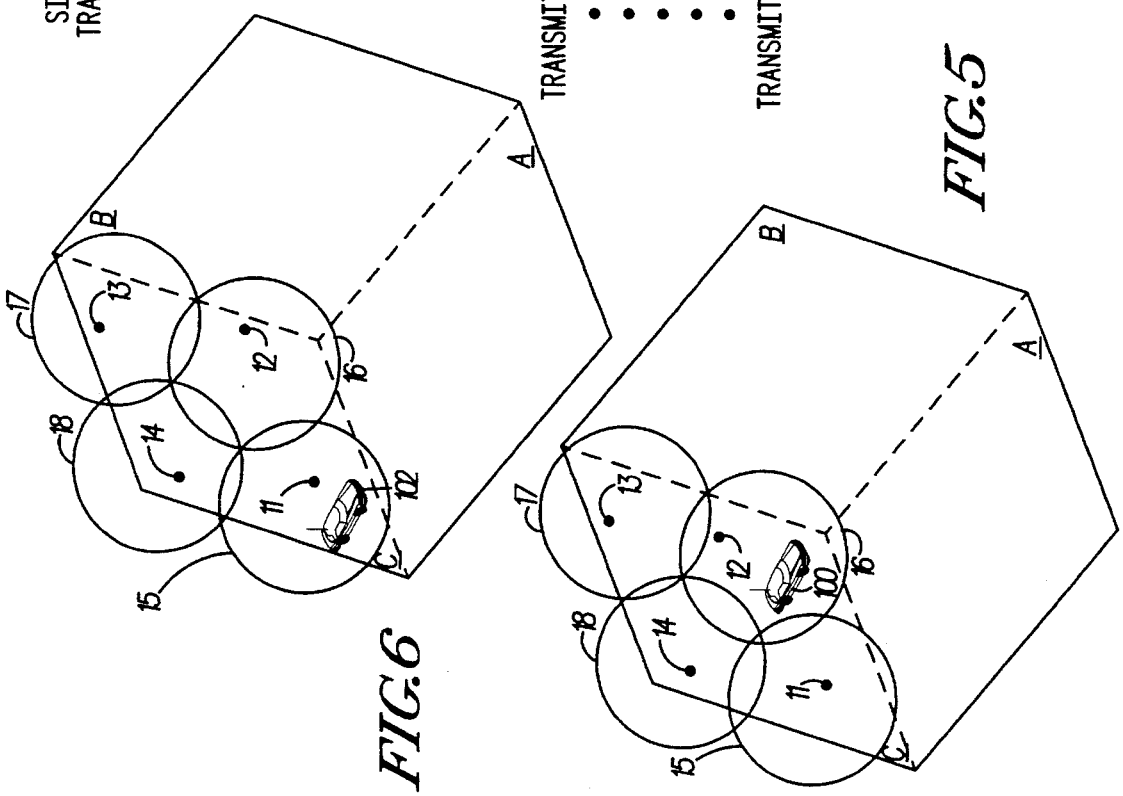
FIG. 5 depicts a micocellular service area providing handoff to a communication unit in accordance with the invention.
FIG. 6 depicts a communication unit handed into a microcellular service area in accordance with the invention.

In FIG. 5 the communication unit (100) is shown as having moved into microcell 12. In so moving into microcell (12) the signal quality factor measured by the Group Switch Scan Receiver (56), through antenna 12, can be assumed to have exceeded the threshold value. In such case the Scanner and Control for Same-channel HO's (28) causes switches 42 and 51 within the Group Switch (25) to re-connect to antenna 12.

By way of another example, another communication unit (102, FIG. 6) may be receiving communication services within service coverage area A through another base site (not shown). Upon a detection that the signal strength is deteriorating a mobile switching center (MSC) (not shown) controlling the microcell base site (20) and the base site for service coverage area A may command the microcell base site (20) to measure the signal strength of the communication unit (102).

The microcell base site, through a scanner (23), would, in turn, measure the signal strength of the communication unit (102) through each of the remote antenna (11-14). The measurements would be performed by connecting the scanner (23) to each of the remote antenna (11-14) through switch 51 and measuring the signal strength of the communication unit (102).

Since the communication unit (102) is shown within microcell 15 the signal strength measured through antenna 11 would presumably exceed the threshold mandating handoff. The MSC, upon comparing signal measurements, may notify the base site (20) to accept a handoff from the base site serving service area A. The MSC, at the same time, would transmit a handoff command to the communication unit (102).

The handoff command transmitted by the MSC to the communication unit (102) would contain the ID of a channel (e.g. channel #2) to be used within service area C through microcell base site 20. The MSC would receive notification of an available channel within service area C upon notification of handoff.

Since the microcell base site (20) measured the highest signal quality factor through antenna 11, the base site (20) could assign service through the antenna (11). On the other hand, since inter-service-area handoffs require relatively long time periods (>5 seconds) the communication unit (102) may have moved out of microcell 15.

To accommodate the possibility that antenna 11 may no longer be the most appropriate antenna, the microcell base site (20) begins transmitting a supervisory audio tone (SAT) on the outbound frequency of channel #2, simulcast through all remote antenna (11-14). The microcell base site (20) simulcasts the SAT by causing the switch (46) to connect to the splitter (42), resulting in the simultaneous transmission of the SAT through all remote antenna (11-14).

The communication unit (102), upon receiving the handoff channel assignment (#2) tunes to the assigned channel (#2) and begins receiving the SAT on the outbound frequency of the assigned channel (#2) from the new serving base site (20). The communication unit, upon receiving the SAT, "loops" the SAT back to the microcell base site (20) on the inbound frequency of the assigned channel (#2) through the communication unit (102) transmitter, under well known prior-art practice.

The base site (20) identifies the antenna (11-14) now proximate the communication unit (102) by scanning and measuring the SAT on the inbound frequency of the assigned channel (#2), by the Group Switch Scan Receiver (56), through each antenna (11-14). The Scanner and Control for Same-channel HO's (28) receives and compares the signal strength values through each antenna (11-14) and selects a serving antenna based upon the highest relative signal strength measured through that antenna (11-14). Upon selection of the serving antenna the Scanner and Control for Same-channel HO's (28) causes the switch for channel #2 to connect with the serving antenna and the exchange of a communicated signal begins.

In another embodiment of the invention a single control receiver and a single control transmitter is provided within the control transceiver (22) for each microcell base site (20). The input to the single control receiver is accomplished by summing an input from each remote antenna (11-14) within a summer (55) within the RX Group Switch (26). Since the resource controller (21), under such an embodiment, cannot determine location of a communication unit upon receipt of a resource request, a SAT is simulcast over all remote antenna (11–14) and the Group Switch Scan Receiver (56) measures for the strongest signal. Upon identification of a proximate antenna (11–14) the Scanner and Control for Same-channel HO's (28) causes the switches (46 and 51) for the assigned channel to connect to the selected remote antenna (11–14).

Simulations of service through multiple remote antennas through the microcell base site (20) over conventional single-antenna service indicate a beneficial capacity improvement, over a 7-cell reuse pattern and 120 degree cells, of 2.33 times under a 3-cell reuse plan. Such an improvement results from lower power levels justified by the smaller distances between centrally-positioned antenna and communication unit. Routing of control traffic through the same proximate antenna results in similar power levels and avoids interference "spikes" caused by varying power levels associated with non-centrally located control antenna.

I claim:

1. In a cellular communication system having a plurality of service coverage areas each with a base site, at least one of the plurality of service coverage areas having a plurality of shared frequency microcells each having an omnidirectional, remote antenna interconnected with the base site, a method of providing communication services comprising the steps of:

receiving a request, at the base site, to provide communication access to a communication unit;

simulcasting supervisory audio tone through each omnidirectional, remote antenna of the plurality of shared frequency microcells;

measuring a signal quality factor of a looped-back supervisory audio tone received from the communication unit at each omnidirectional, remote antenna of the plurality of shared frequency microcells; and establishing a communication link between the communication unit and base site through a selected antenna of said plurality of omindirectional, remote antennas of the plurality of shared frequency microcells, said selected antenna being selected based upon said signal quality factor of said looped-back supervisory audio tone received at said selected antenna.

2. The method as in claim 1 wherein the step of receiving a request to provide communication access to a communication unit further includes the step of transferring a resource request, received by a remote antenna from the communication unit, to the base site.

3. The method as in claim 1 wherein the step of receiving a request to provide communication access to a communication unit further includes the step of transferring a handoff request from an adjacent service coverage area of the plurality of areas to the base site.

4. The method as in claim 1 further including the step of comparing the measured signal quality factors of said plurality of omindirectional, remote antenna and selecting the antenna providing the highest relative magnitude signal quality factor as the antenna proximate the communication unit.

5. The method of claim 4 further including the step of re-measuring the signal quality factors of the communication unit through each omnidirectional, remote antenna.

6. The method as in claim 5 further including the step of comparing the re-measured signal quality factors and selecting the antenna providing the highest relative magnitude signal quality factor as the antenna proximate the communication unit.

7. The method as in claim 1 wherein the step of establishing a communication link between the requesting communication unit and base site through the selected antenna further includes the step of allocating an interconnect, with such interconnect including one of an interconnect group comprising wireline and fiber optics, between a switch located at a base site and the selected antenna.

8. The method as in claim 7 further including the step of re-establishing a communication link between the requesting communication unit and base site through the remote antenna based, at least in part, upon remeasured signal quality factors.

* * * * *